United States Patent [19]

Gerbehy et al.

[11] Patent Number: 5,410,542
[45] Date of Patent: Apr. 25, 1995

[54] SIGNAL COMPUTING BUS

[75] Inventors: Jay L. Gerbehy, Califon; Richard P. Graber, Westwood, both of N.J.

[73] Assignee: Diaogic Corporation, Parsippany, N.J.

[21] Appl. No.: 24,622

[22] Filed: Mar. 1, 1993

[51] Int. Cl.$^6$ ............................ H04J 3/12; H04Q 11/04
[52] U.S. Cl. ................................ 370/85.1; 370/85.11; 370/100.1; 340/825.06
[58] Field of Search .................. 370/58.2, 59, 67, 68.1, 370/85.11, 85.13, 85.9, 100, 105.1, 105.2; 340/825.06, 825.14, 825.07, 825.2, 825.5, 825.51; 371/8.2, 8.1, 11.1, 11.2, 47.1, 61; 368/46, 48; 375/108

[56] References Cited

U.S. PATENT DOCUMENTS

| | | | |
|---|---|---|---|
| 4,656,627 | 4/1987 | Hasley et al. | 370/85.11 X |
| 4,835,773 | 5/1989 | Kuwahara et al. | 371/8.1 |
| 5,107,492 | 4/1992 | Roux et al. | 370/85.11 X |
| 5,202,883 | 4/1993 | Hatherill et al. | 370/67 |
| 5,291,479 | 3/1994 | Vaziri et al. | 370/85.11 X |

FOREIGN PATENT DOCUMENTS

WO85/05241 11/1985 WIPO ................... 370/85.11

*Primary Examiner*—Douglas W. Olms
*Assistant Examiner*—Melvin Marcelo
*Attorney, Agent, or Firm*—Michael B. Einschlag

[57] ABSTRACT

A signal computing bus (SCbus) includes two bus structures: (a) a synchronous TDM data transport referred to as a data bus and (b) a serial message passing bus referred to as a message bus. The following three groups of functions are performed using the SCbus: (a) data transport over the data bus, (b) message passing over the message bus, and (c) data and message bus control. In a preferred embodiment, the data bus utilizes: 2 clocks, 1 frame pulse, 16 data busses, and 1 clock control (the clock control signal enables access to the bus and automatic switching from one clock master to another when an error is detected) and the message bus is fabricated using a master HDLC protocol with contention resolution.

18 Claims, 13 Drawing Sheets

SCBUS NODE IMPLEMENTATION

TIMING GENERATOR (SHEET 1)

COUNTER TIMING
SLAVE MODE SHOWN

TIMING GENERATOR (SHEET 2)

SR EDGE TRIGGERED LATCH 290

DIGITAL SWITCH MAP

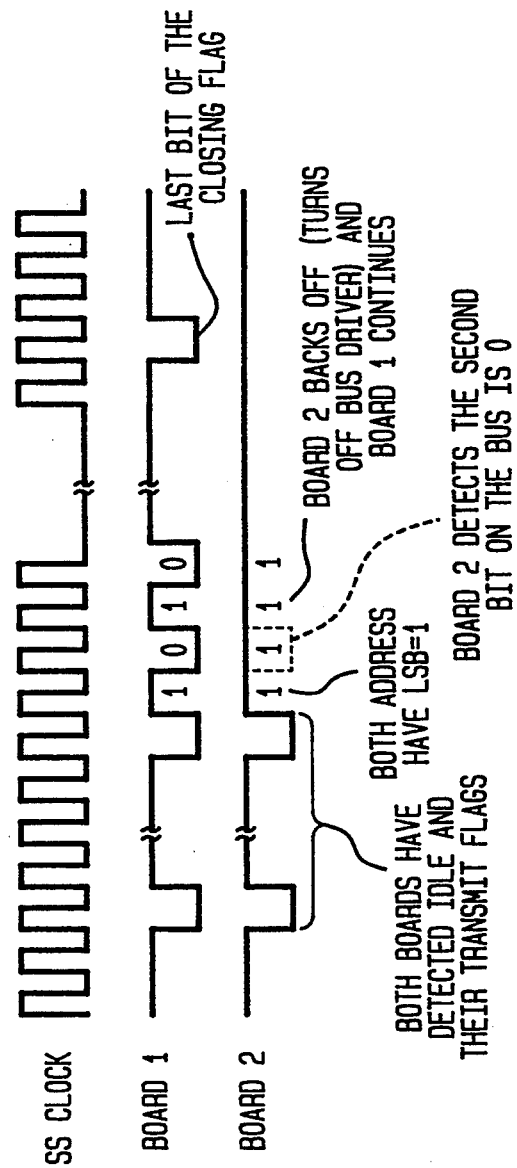

DESTINATION SWITCH

SOURCE SWITCH

SIGNAL COMPUTING BUS

TECHNICAL FIELD OF THE INVENTION

The present invention pertains to the field of telephony and, in particular, to a bus for use in telecommunications data-processing systems utilizing multiple technologies and standard interfaces.

BACKGROUND OF THE INVENTION

Call processing sits at the intersection of a continuing convergence between the computer and telecommunications industries. The global presence of public switched telephone networks and the availability of private networks make telephone equipment an ideal terminal for accessing computer-based information. Conversely, computer databases provide information which is necessary for enhanced telecommunications services. This natural convergence between the computer and telecommunications industries is facilitated by call processing. Further, integration of automated call control and signal processing algorithms, such as digital audio, image compression, speech recognition and text-to-speech conversion, can enhance many communications processes.

Signal computing refers to low-level manipulation of data in a way that adds value to the data. For example, when information arriving over a telephone line is digitized, compressed, and stored on a disk, value is added because the information has been converted to a more useful format. Signal computing systems combine to provide a foundation for call processing by combining three necessary elements: (a) network interface devices provide input and output of signals that are transmitted and switched in telecommunications networks; (b) digital signal processors and software algorithms transform the signals through low-level manipulation; and (c) application programs provide computer control of the processed signals to bring value to the end user. A Signal Computing System Architecture is a hardware and software architecture which is used to build telecommunications/data-processing systems with multiple technologies and standard interfaces.

A Signal Computing System Architecture promotes growth of the emerging telecommunications/data processing industry by providing an infrastructure for application developers, technology suppliers, tool providers, and system integrators to work together in deploying customer solutions. Such an architecture makes it easier to develop bigger, more flexible, and more sophisticated systems in modular fashion by providing layers of compatible hardware and software elements with open interfaces between them. These open interfaces promote integration and interoperability among specialized products from different vendors.

In order to provide the Signal Computing System Architecture, one needs a bus that allows information to be transmitted and received among resources over multiple lines, which can carry information at high speed, and which can provide out-of-band signaling.

Thus, there is a need in the art for a TDM bus which provides increased bus bandwidth, out-of-band signaling, enhanced switching capabilities, out-of-box expansion capabilities, and increased reliability for use in the Signal Computing System Architecture.

SUMMARY OF THE INVENTION

Embodiments of the present invention advantageously solve the above-identified need in the art by providing a TDM bus which provides increased bus bandwidth, out-of-band signaling, enhanced switching capabilities, out-of-box expansion capabilities, and increased reliability for use in the Signal Computing System Architecture. In particular, an embodiment of the present invention, referred to below as a signal computing bus (SCbus), is a serial digital bus which connects boards in a call processing node and which provides data transport and messaging facilities.

The SCbus serves as the underlying hardware technology for the Signal Computing System Architecture and it allows a system to grow from a single node (box) system to a multiple node (box) system. In a preferred embodiment, up to eight boxes are allowed per system. All the same characteristics of an intra-box SCbus apply to an inter-box bus as well.

As will discussed in detail below, SCbus supports clear channel data transport and out-of-band signaling to provide flexible, real time call processing configurations. Further, the preferred embodiment of the SCbus is designed with the bandwidth and time slot bundling capability to support audio and fax data as well as high speed data and full motion video for future datacom and multi-media applications.

Still further, the SCbus provides a non-blocking space-time switch which enables systems to be configured using a distributed switching model with a minimum number of time slots. Yet still further, all channels can transmit to and receive from all time slots, thereby ensuring full flexibility in establishing one way, full duplex and broadcast connections.

In accordance with the present invention, signaling over the SCbus is handled on a separate line and, in a preferred embodiment of the present invention, is implemented using a multimaster HDLC protocol with contention resolution. This manner of handling signaling provides "ISDN-like" signaling to meet real-time response requirements of the telephone network and it also provides an inter-processor message passing capability which enables enhanced communications between system resources.

In a preferred embodiment of the present invention, every SCbus-connected module utilizes a circuit which provides bus access and time slot switching. Further, in the preferred embodiment, the circuit also provides full frame buffering so that time slots can be bundled for clear channel data transport and automatic clock switchover capability for increased system reliability.

Architecturally, an SCbus is comprised of two bus structures; a synchronous TDM data transport referred to as a data bus and a serial message passing bus referred to as a message bus. The following three groups of functions are performed using the SCbus: (a) data transport over the data bus, (b) message passing over the message bus, and (c) data and message bus control. A common interface defines inter-board communication and data transfer protocols to tie the three functional groups together and to enable a system designer to structure a system to meet specific application needs.

A preferred embodiment of the SCbus comprises a synchronous TDM data bus having 16 synchronous data lines which run at, for example, 2.048 Mbps, 4.096 Mbps, or 8.192 Mbps, to provide, for example, 32 Mbps, 64 Mbps, or 128 Mbps, system bandwidth, respectively, and which can accommodate up to 2048 bi-directional time slots running at 128 Mbps. The preferred embodiment of the SCbus is designed for both ribbon cable and backplane implementations, and is electrically compatible with the PEB bus of Dialogic, the ST-Bus of Mitel, and the PCM Highway of Siemens. This synchronous TDM data bus is a data transport bus comprised of: 2 clocks, 1 frame pulse, 16 data busses, and 1 clock control. The clock control signal enables access to the bus and automatic switching of a clock master when an error is detected on a primary clock master. The data bus provides a mechanism for inter-board bulk data transfer. The SCbus further comprises a serial message passing bus (Supervisory channel) which is used to transport signaling and inter-board messages. In a preferred embodiment, the message passing transfer rate is 2.048 Mbps (Advantageously, a message passing bus is a simple and low cost alternative to a parallel system bus that is normally used in a processor based system. Multiple devices can be connected to this messaging passing bus to contend for bus access.). A DNA bus is designed for system expansion. This bus maintains all of the features of the SCbus and, in addition, in a preferred embodiment, the DNA bus uses: (a) an RS485 interface wherein cable length can be up to 25 meters and (ii) an SCSI type connector providing up to 16 nodes per system.

BRIEF DESCRIPTION OF THE DRAWING

A complete understanding of the present invention may be gained by considering the following detailed description in conjunction with the accompanying drawing, in which:

FIG. 11 shows, in pictorial form, an example of contention resolution for the message bus;

DETAILED DESCRIPTION

Figure 1:
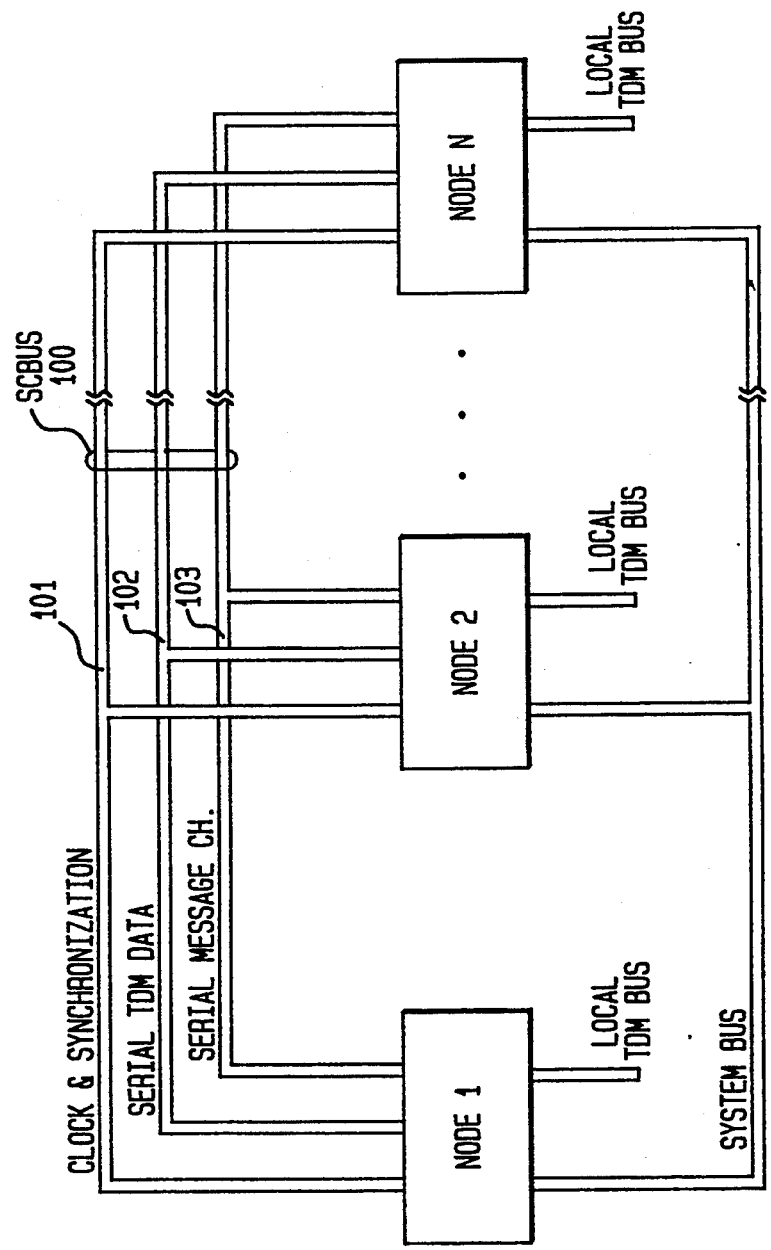
FIG. 1 shows a block diagram which illustrates the manner in which multiple Signal Computing nodes are connected to an SCbus.

An SCbus is the underlying hardware technology for Signal Computing System Architecture products and it enables a system to grow from a single node (box) system to a multiple node (box) system. All the same characteristics of an intra-box SCbus apply to an inter-box bus as well. Architecturally, an SCbus is comprised of two bus structures; a synchronous TDM data transport bus referred to as a data bus and a serial message passing bus referred to as a message bus. The following three groups of functions are performed using the SCbus: (a) data transport over the data bus, (b) message passing over the message bus, and (c) data and message bus control. As will be described in detail below, a common interface that defines inter-module communication and data transfer protocols to tie the three functional groups together and to enable a system designer to structure a system to meet specific application requirements.

With respect to the dual bus structure, consider that there are four types of data movement in a typical telecommunication system: (a) board-to-board high speed bulk data transfer; (b) board-to-board message, for example, signalling or control, transfer; (c) CPU-to-memory or I/O data transfer; and (d) CPU-to-board message transfer. The SCbus architecture described in detail below provides two specific serial busses for board-to-board data movement: (a) a data bus—in a preferred embodiment, this data transport bus is comprised of sixteen (16) synchronous TDM data lines to provide a guaranteed bandwidth for board-to-board data transfer which can operate at 2.048 Mbps, 4.096 Mbps, or 8.192 Mbps—and (b) a message bus—this message passing bus provides inter-board communication and provides a simple, low cost alternative to a parallel system bus that is normally used in a processor based system and, in a preferred embodiment, the message bus is a multi-master (contention) bus specified to run at 2.048 Mbps.

A preferred embodiment of the SCbus comprises a synchronous TDM data bus having 16 synchronous data lines which run at, for example, 2.048 Mbps, 4,096 Mbps, or 8.192 Mbps, to provide, for example,. 32 Mbps, 64 Mbps, or 128 Mbps, system bandwidth, respectively, and which can accommodate up to 2048 bi-directional time slots running at 128 Mbps. This synchronous TDM bus is a data transport bus comprised of: 2 clocks, 1 frame pulse, 16 data busses, and 1 clock control. The clock control signal enables access to the bus and automatic switching of a clock master when an error is detected on a primary clock master. As such, the data bus provides a mechanism for inter-board bulk data transfer and the sixteen synchronous TDM delta lines of the data bus provide a guaranteed bandwidth for such transfers. The smallest switchable unit on the data bus is the time slot. A time slot comprises 8 consecutive bits of data and time slot data is transmitted in frames. The number of time slots in each frame depends on the choice of data bus bandwidth and is either 32, 64, or 128 time slots per frame. However, the bandwidth equivalent of one time slot remains fixed at 64 Kbps.

The SCbus further comprises a serial message passing bus (Supervisory channel) which is used to transport signaling and inter-board messages. As such, the message bus provides a mechanism for inter-board message communication and may be utilized as a simple, low cost: alternative to an extended, parallel system bus. In a preferred embodiment, the message passing transfer rate is a multi-master (contention) bus specified to run at 2.048M bps.

The SCbus data path is a point-to-point link between any two ports without signal loss. This data path has the following characteristics: (a) only one port may transmit data during a time slot period; (b) any number of ports may receive data during a time slot period; (c)

there is no restriction on the values of the data that can be transferred over the data bus; (d) time slots may be bundled to create data paths with multiDS0 bandwidths; and (e) any time slot may be used for transmitting or receiving data., FIG. 1 shows a block diagram which illustrates the manner in which nodes are connected to an SCbus. As shown in FIG. 1, SCbus nodes 1, 2, and N each receive input from a local TDM bus. Further each of SCbus nodes 1, 2, and N are connected to SCbus 100 and, in particular, SCbus nodes 1, 2, and N are each connected to clock and synchronization channel 101, serial TDM data channel 102, and serial message channel 103. As will be explained in detail below, channels (timeslots) from a first local Time Division Multiplexed (TDM) bus can be virtually connected (switched) to any channel of another node's local TDM bus.

In addition to serial TDM data channel 102, SCbus 100 is comprised of message channel 103. Transferring data between SCbus nodes through message channel 103 can alleviate the burden of transferring node-to-node messages through system bus 104 shown in FIG. 1.

SCbus 100 supports the following signals:

| Data Bus: | |
|---|---|
| SCLK | This signal is driven by a clock master and is used to read serial data from, and write serial data to, the data bus. Data transitions occur on the positive going edge of this signal. In the preferred embodiment, the frequency of SCLK is specified to be either 2.048 Mbps, 4.096 Mbps, or 8.192 MHZ. The frequency of SCLK may be selectable. |
| SCLKX2_N | System clock-times-Two. This signal is driven by the clock master and is synchronous to, and twice the frequency of, the system data rate. The SCLKX2_N signal is inverted in phase from SCLK and SCLK transitions occur on the falling edge of SCLKX2_N. |
| FSYNC_N | Frame synchronization signal. In the preferred embodiment, this active low signal (logic 0) is driven by the clock master and is used to indicate the start of a data frame. FSYNC_N goes low for one SCLKx2_N period, one half bit period prior to the first bit of the first time slot of the frame. |
| CLKFAIL | Bus master indication signal. In the preferred embodiment, CLKFAIL is an active high signal which is driven by the clock master and is driven with open collector drivers. During normal operation of the system clocks CLKFAIL is held low. If the clock master detects the failure of, or the loss of synchronization within, the clock source it releases CLKFAIL, which is then pulled high. CLKFAIL is also used to initiate the reassignment of the role of clock-master from one board to another. |
| SD_[15:0] | 16 bidirectional serial data lines which carry TDM data between nodes. |
| Message Bus: | |
| SS | System Signalling bidirectional line for message channel communication over the serial message bus. In the preferred embodiment, SS is driven with open collector drivers. |
| GND | System ground |

In accordance with a preferred embodiment of the present invention: (a) all message bus drivers are TTL open-collector drivers; (b) all data bus drivers are TTL tri-state drivers and it is preferable that Schmidt-trigger receivers be used on all timing signal inputs; and (c) resistive bus termination is provided on every SCbus node. In particular, the following signals are terminated with a 100K Ohm resistor to +5 Volts: SCLKX2_N, SCLK, FSYNC_N, and SD_[15:0], whereas, the following signals are terminated with a 4.7K Ohm resistor to +5 Volts: CLKFAIL and SS. In a preferred embodiment of the present invention for use in ribbon cable embodiments intended for interconnection of PC/AT or PC/2 standard cards, the SCbus uses straight 26 conductor "ribbon" cable as the physical connection between board. The connector is a 26-pin right angle connector, Amphenol TM type 842-821-2699-895, or equivalent. Two polarization tabs are required per connector, Amphenol TM type 842-800-1611-003, or similar. Those of ordinary skill in the art should understand that the present invention is not limited to such embodiments and may be fabricated in different configurations where different mechanical implementations, for example, a back plane bus, may be more suitable.

Figure 2:
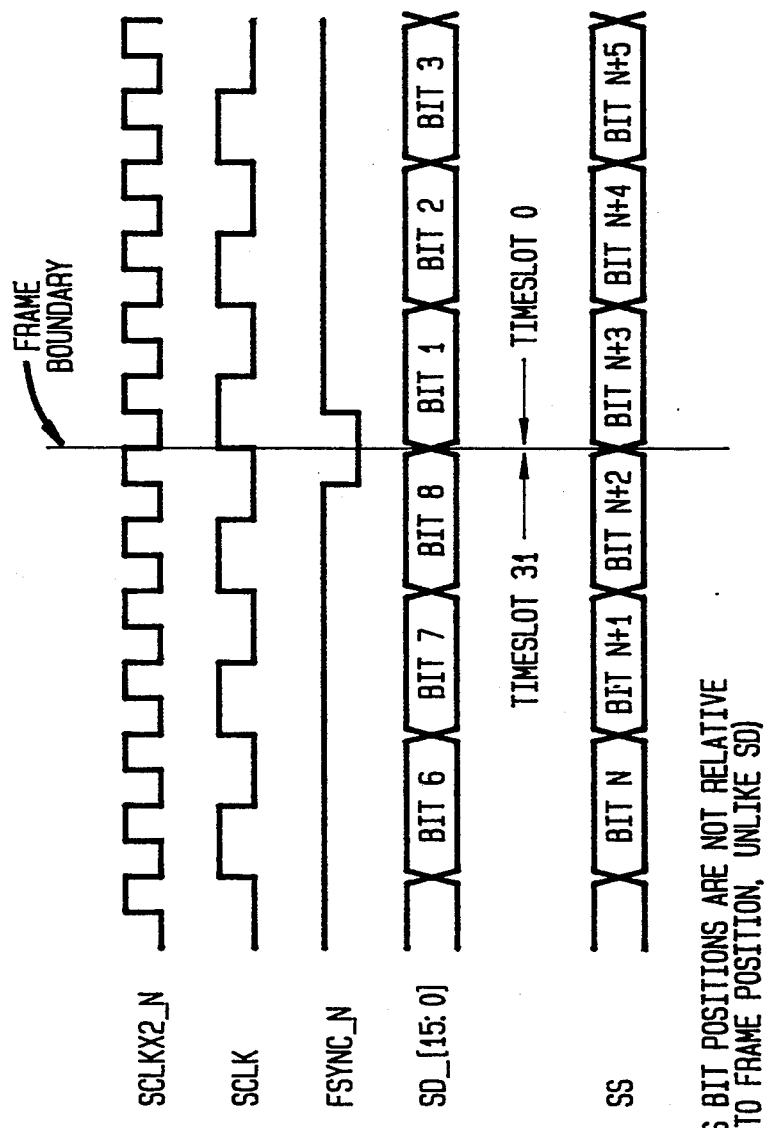
FIG. 2 shows, in graphical form, a timing diagram illustrating the relationship between SCbus signals when operating in a 2 Mbps mode.

FIG. 2 shows, in graphical form, a timing diagram illustrating the relationship between SCbus signals when operating in a 2 Mbps mode.

The message bus is a multi-master serial bus running at a fixed rate and, in the preferred embodiment, this rate is 2.048 Mbps. An SS clock signal is generated by every board which is capable of accessing the message bus. The SS clock is defined to be a 50% duty cycle signal running at 2.048 Mbps, synchronous to SCLKx2_N. Data is shifted onto the message bus on the rising edge of the SS clock and read off the message bus on the falling edge of the SS clock. The relationship between SS clock, FSYNC_N, and SCLKx2_N is shown in FIG. 2. For the example shown in FIG. 2, SCLK is running at 2.048 Mbps. Whenever a board has no data to transmit over the message bus it must present a high impedance interface to the message bus. Whenever the message bus is pulled high for more than 8 consecutive bit periods, i.e., whenever more than 8 consecutive 1s are detected on the message bus, the bus is said to be in the IDLE state. In order to prevent transmission of false IDLE patterns, the message bus interface transparently insert 0s, bit stuffing, in accordance with the specifications of the HDLC protocol.

Figure 10A:
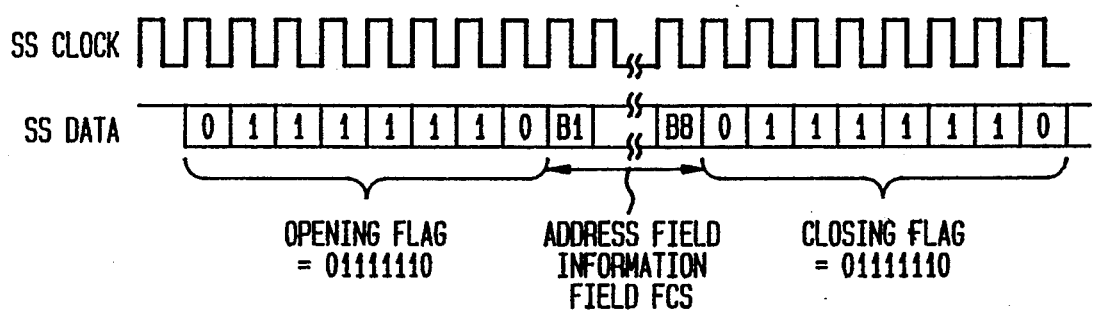
FIG. 10 shows, in pictorial form, the message bus frame format.
Figure 10B:
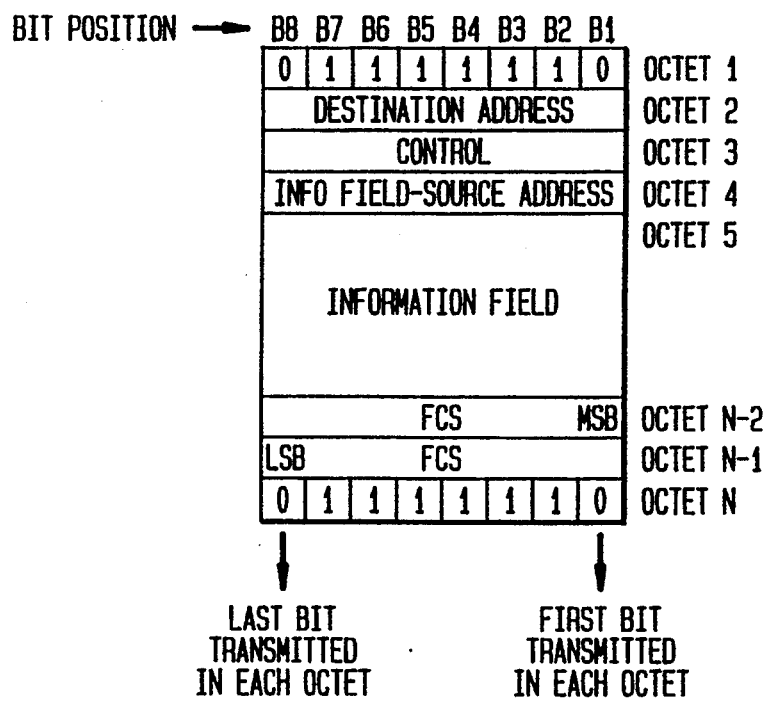

Messages sent over the message bus are arranged in frames. Each message frame is defined by a pair of identical flags, which flags begin and terminate the frame. This frame flag is specified to be the binary sequence 01111110, hexadecimal 7E, in accordance with the HDLC protocol. A message bus message frame must not be confused with a data bus data frame, which is defined by FSYNC_N alone. FIG. 10 shows, in pictorial form, the message bus frame format. In the preferred embodiment, the minimum frame length is 9 octets, the maximum frame length is 128 octets, and the message frame contents conform with the CCITT HDLC protocol.

Each board that is capable of transmitting data on the message bus must be able to monitor the state of the bus, simultaneous to such a transmission. Bus contention is detected whenever a board shifts a 1 (high) onto the bus, but simultaneously reads a 0 (low). Bus contention is resolved in accordance with the following procedure: (a) the first board to detect contention must immediately abort its message frame and set its message bus interface to the high impedance state; (b) the board will not attempt retransmission of the aborted frame until it sees the message bus is in the IDLE state; and (c) once a board has transmitted a full message frame it must not attempt a further transmission until it has detected 10 successive 1s on the message bus. FIG. 11 shows, in pictorial form, an example of contention resolution for the message bus.

In a preferred embodiment of the present invention, the data bus is a space-time division multiplexed serial bus running at 2.048 Mbps, 4.092 Mbps, or 8.192 Mbps providing point to pint connections between a transmitting board and one or more receiving boards. In accordance with the preferred embodiment, only one board is permitted to drive the data bus during any particular time slot period and any time slot may be used to transmit or receive data. Further, data or bit sequence integrity is maintained for the length of a DS0 transmission path (a data path with a bandwidth of 64 Kbps). Bit integrity is considered to be maintained whenever the binary values in a byte transmitted by a board are exactly reproduced at the receiver, connections using a robbed-bit signaling and controlled slip are exceptions. The maintenance of bit integrity is the equivalent of a 0 db transmission loss and, therefore, the data bus will appear as a 4-wire transmission path with no signal loss. Still further, byte sequence integrity is maintained for the length of the DS0 transmission path. Byte integrity is maintained whenever the sequence of bytes in a frame remains the same between source and destination. Controlled slip is an exception. Byte integrity is equivalent to time slot integrity. Yet still further, time slot sequence integrity is maintained for a multiple time slot (multi-DS0) path. Time slot sequence is considered to maintained whenever a set of time slots within a frame retain the same relative positions within the frame, from source to destination. Yet again still further, data paths are bit-sequence independent and there are no restrictions on the number of consecutive 1s and 0s or any binary pattern able to be transmitted on a DS0. Because the data bus does not use acknowledgements, or any other form of handshaking, to synchronize data transfers, it is important to adher strictly to the relationships between timing signals and data. There are three important timing relationships: (a) bit; (b) time slot; and (c) frame. Bit synchronization establishes the proper timing for sending receiving data and time slot and frame synchronization to ensure that operation of all data bus interfaces are synchronized. In the preferred embodiment, the following rules are followed: (a) data must be shifted onto the bus on the rising edge of SCLK; (b) data must be shifted off the bus on, or after, the falling edge of SCLK; (c) the time slot counter must be reset during the FSYNC_N pulse; and (d) the time slot counter must be incremented or reset on the rising edge of SCLK.

Each serial data stream on the data bus is divided into frames and each frame is further divided into 8-bit subframes called time slots. The first time slot is designated time slot 0 (TS0), the second TS1, and so forth. The first bit in each used time slot is designated as B1 and is transmitted or received first. The last bit in a time slot is designated B8 and is transmitted or received last. This bit numbering scheme adheres to CCITT conventions. For a PCM coded byte, B1 is the sign bit and B2 is the MSB of the byte whereas, for binary data bytes, B1 is the LSB. If a board is not writing data to the data bus, it must present a high impedance interface to the bus so that time slots which are not being used will be pulled high. In the preferred embodiment, coded speech energy levels on the data bus comply with FCC regulations and, therefore, the average coded speech energy level transmitted on an SCbus channel should not exceed −12 dbm0 when averaged over a 3 second period. Further, the average coded network signaling energy level transmitted on an SCbus channel should not exceed −3 dbm0.

As described above, the data bus is a synchronous, TDM, serial bus and data transfers over the bus are accomplished by assigning one or more time slot IDs (for example, a data bus stream number, plus a time slot number) to the transmitting and receiving boards. During the assigned time slot period(s), the transmitting board will drive the bus and the receiving board will read data off the bus. A transmission path that transports data between two end points is referred to as a channel. The interface point between a channel and a board is referred to as a port. When a channel connects two ports a call exists. The hardware which implements channels and maps between SCbus time slots and a board's internal TDM bus time slots will be described in detail below.

The SCbus supports three classes of data transfer: (a) symmetrical data transfer wherein two ports both send data to, and receive data from, each other; (b) asymmetrical data transfer wherein a port receives data from a port other than the one(s) to which it is transmitting; and (c) broadcast data transfer wherein one port transmits, and multiple ports receive, on one channel, i.e., where a port establishes a transmission call to several ports simultaneously.

In accordance with the present invention, a Signal Computing node can be configured as an SCbus bus master or as the SCbus bus slave. Whenever a Signal Computing node acts as the SCbus master, it sources clock and synchronization to the SCbus. Whenever a Signal Computing node acts as the SCbus slave, it receives clock and synchronization from the SCbus. In accordance with the present invention, only one Signal Computing node can be bus master at any one time.

In accordance with the present invention, master control of the SCbus is transferred between Signal Computing by means of a CLKFAIL signal. Whenever a Signal Computing node becomes SCbus master, in addition to sourcing clock and synchronization, it drives a CLKFAIL signal low (logic 0) indicating to other nodes, thereby, that the clock is not in the failed state. Whenever a node can no longer maintain the role of SCbus master (for example: when the node's clock reference is no longer valid) the node stops sourcing clock and synchronization and releases the CLKFAIL signal. CLKFAIL is then pulled-up (logic 1) by system termination resistors and the SCbus is in a state without a bus master. At this point a node previously defined (for example, by system software) as a secondary bus master senses (through the CLKFAIL signal) that the primary bus master has failed. The secondary bus master node then begins sourcing clock and synchronization and drives CLKFAIL low to indicate that the system is back in operation.

Figure 3:
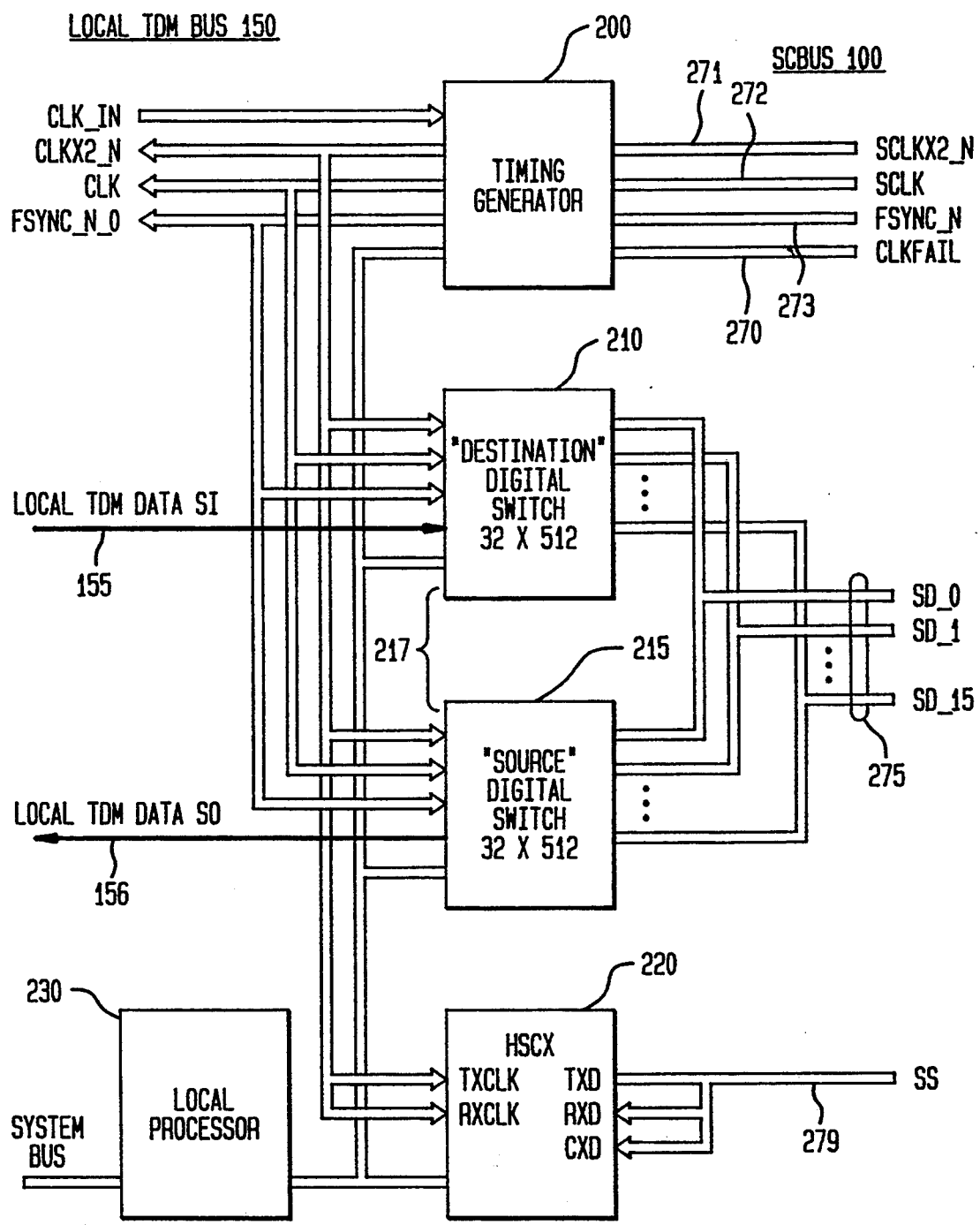
FIG. 3 shows a block diagram of an SCbus node.

FIG. 3 shows a block diagram of a typical SCbus node. As shown in FIG. 3, a typical SCbus node comprises the following: (a) Timing Generator 200, (b) Digital Switch 217, (c) Serial Communications Controller (HSCX) 220, and (d) Local Processor 230. Timing Generator 200 provides the clock and synchronization necessary to connect to SCbus 100. When enabled as bus master, as described above, timing generator 200 drives CLKFAIL signal 270 low and enables tri-state drivers for SCLKX2_N 271, SCLK 272 and FSYNC_N 273. As a bus slave, timing generator 200 monitors SCLKX2_N 271, SCLK 272 and FSYNC_N 273 signals received from SCbus 100 to provide timing information to local TDM bus 150 to keep the two in sync.

As shown in FIG. 3, Digital Switch 217 is comprised of two sections: (a) "Destination" switch 210 which outputs local TDM serial lines 155 to SCbus SD_[15:0] ports 275 and (b) "Source" switch 215 which inputs local TDM serial lines 156 from SCbus SD_[15:0] ports 275. In accordance with the present invention, "Destination" and "Source" switches 210 and 215 are controlled by a switch routing memory which makes a virtual connection between local TDM bus timeslots 155 and 156 and SCbus timeslots/ports 275. Local Processor 230 assigns switch connections by writing to the switch routing memory in a manner which is well known to those of ordinary skill in the art. In a typical configuration, the 16 serial data ports 275 (SD_[15:0]) of SCbus 100 contain 32 timeslots each (32 timeslots×16 serial data lines=512 timeslots). Thus, in such a typical configuration, "Destination" and "Source" switches 210 and 215 each have the capacity of connecting 32 local timeslots to 32 out of 512 SCbus timeslots. Note that the 32×512 configuration was chosen as an example for simplicity of explanation and is not a limitation on the system. As those of ordinary skill in the art can readily appreciate, the design for timing generator 200 becomes more complicated when local TDM bus 150 and SCbus 100 do not have the same number of timeslots per frame.

Serial Communications Controller (HSCX) 220 provides an interface between System Signalling (SS) line 279 and local processor 230. HSCX 220 is provided by commercially available integrated circuits such as a Siemens High Level Serial Communications Controller Extended (HSCX). The Siemens HSCX implements a half duplex HDLC channel in a bus (multimaster) configuration. The multimaster configuration is supported by internal collision detection/resolution algorithms which maximize throughput on the message channel. In a preferred embodiment of the present invention, the raw data rate of the message channel is 2 Mbps.

Local Processor 230 provides both a means of controlling Timing Generator 200, Digital Switch 217 and the Serial Communications Controller 220 and of interfacing to SCbus 100. In a typical application, local processor 230 is embodied utilizing a commercially available microprocessor such as the Intel 80186.

Figure 4:
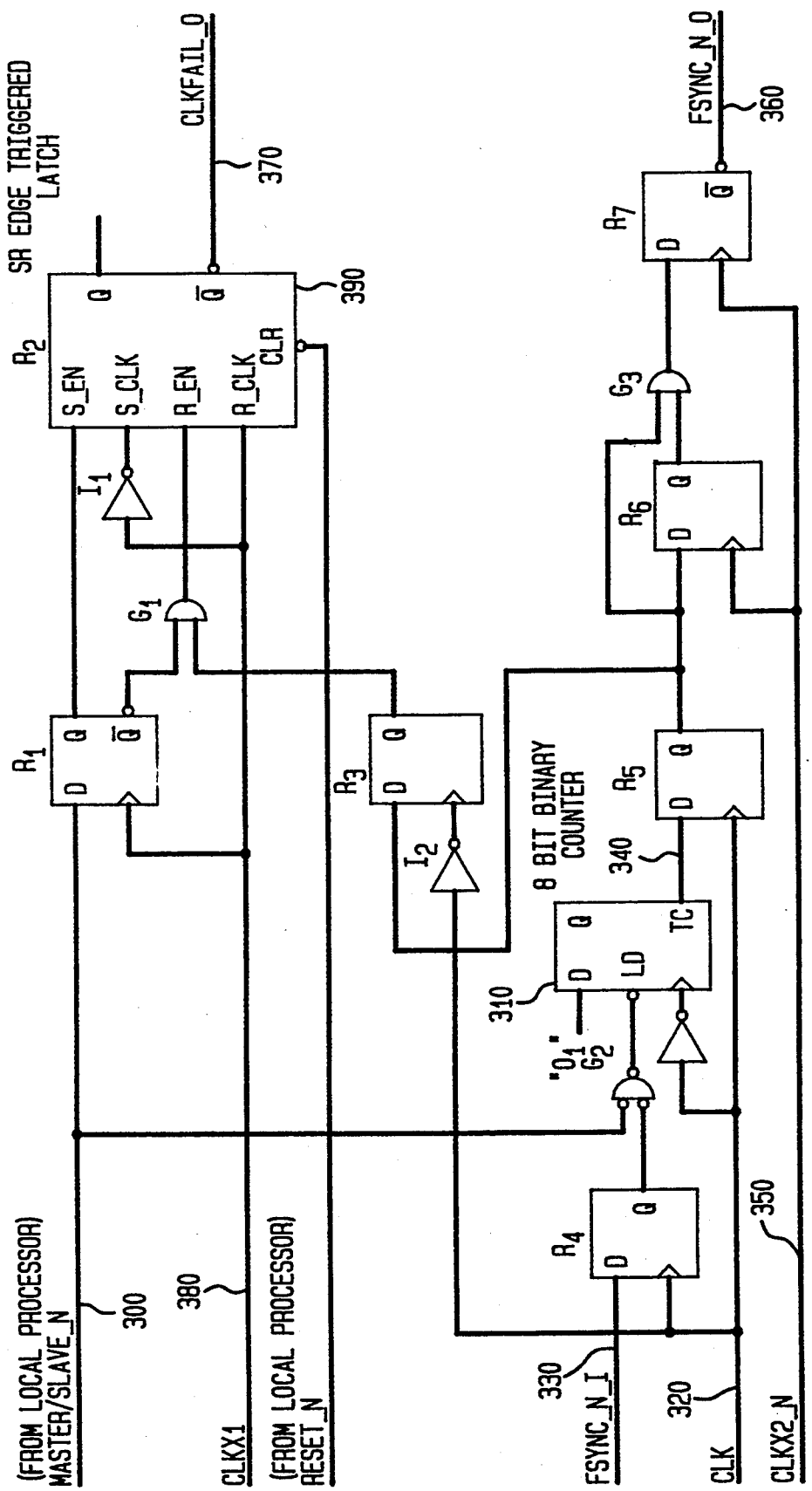
FIG. 4 shows a block diagram of a first portion of an embodiment of timing generator 200 shown in FIG. 3.

FIG. 4 shows a block diagram of a first portion of an embodiment of timing generator 200 shown in FIG. 3. As was described above, timing generator 200 is configured by local processor 230 to be in either a bus master or a bus slave mode. As shown in FIG. 4, this is accomplished when local processor 230 sets MASTER/SLAVE_N signal 300 (logic 1) for the bus master mode and clears MASTER/SLAVE_N signal 300 (logic 0) for the bus slave mode. The heart of timing generator 200 is 8-bit binary counter 310. The counter value increments on the falling edge of CLK signal 320 and the count sequence is from 0 Hex to FF Hex, repeating. In the bus master mode, MASTER/SLAVE_N signal 300 is set (logic 1), thereby forcing the output of gate G2 to be high (logic 1). This causes the load function of counter 310 to be disabled and, in turn, causes counter 310 to free run. In the bus slave mode, MASTER/SLAVE_N signal 300 is cleared (logic 0). This enables the output of gate G2 to be controlled by the "Q" output of "D" flip flop (DFF) R4. FSYNC_N_I 330 is clocked into the "D" input of R4 on the rising edge of CLK 320. Whenever the "Q" output of R4 is low (logic 0), 8-bit counter 310 is loaded to the value 01 Hex on the falling edge of CLK 320.

Whenever 8-bit counter 310 reaches FF Hex, TC (terminal count) signal 340 goes high (logic 1). TC signal 340 is then clocked into the DFF R5 with the rising edge of CLK 320. The "Q" output of R5 is then clocked into the DFF R6 with the rising edge of CLKX2_N 350. The "Q" output of R6 is then "anded" with the "Q" output of R5 and then clocked into DFF R7 with the rising edge of CLKX2_N 350. The resulting Q_N output of R7 is FSYNC_N_O signal 360 which identifies a frame boundary.

Timing generator 200 defaults to bus slave mode during reset. To become bus master, timing generator circuit 200 has to clear (logic 0) CLKFAIL_O signal 370, which signal is the source for CLKFAIL and which signal also controls tri-state enables for SCLKX2_N, SCLK and FSYNC_N. Local Processor 230 sets (logic 1) MASTER/SLAVE_N signal 300 which is synchronized with CLKX1 signal 380 by clocking MASTER/SLAVE_N 300 into the D input of R1 with the rising edge of CLKX1 380. The Q output of R1 is then fed to the S_EN of the SR Edge Triggered Latch (SREL) 390 and the S_CLK input is clocked on the falling edge of CLKX1 380. CLKFAIL_O 370 goes low (logic 0) and the node is now a bus master. To release from being bus master, Local Processor 230 clears (logic 0) MASTER/SLAVE_N signal 300 which is synchronized with CLKX1 signal 380 by clocking MASTER/SLAVE_N 300 into the D input of R1 with the rising edge of CLKX1 380. The Q_N output of R1 is then anded with the Q output of R3. R3 clocks the Q output of R5 with the falling edge of CLK 320. The output of G1 is then fed to the R_EN of SREL 390 and the R_CLK input is clocked on the rising edge of CLKX1 380. CLKFAIL_O 370 goes high (logic 1) and the node is now a bus slave.

Figure 5:
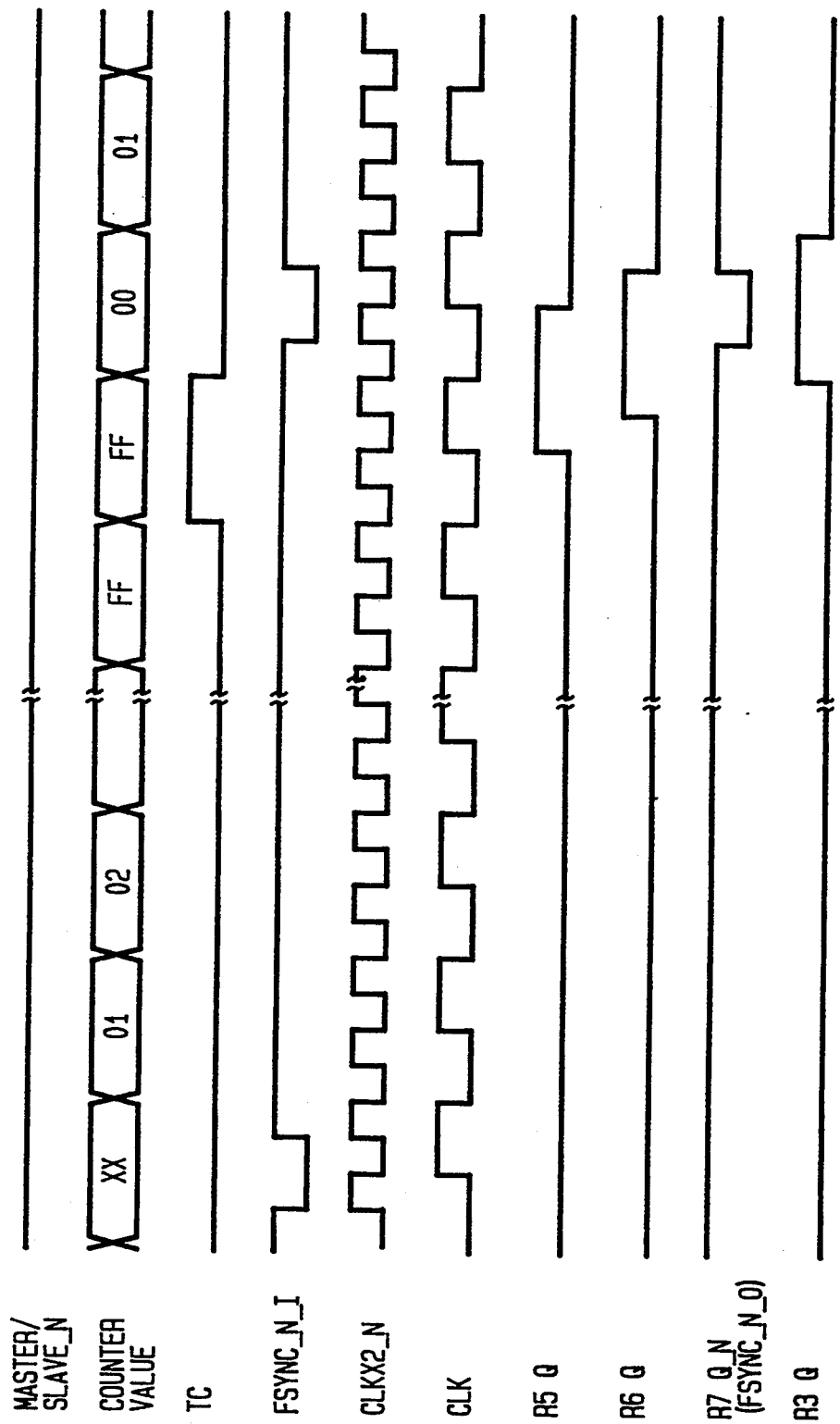
FIG. 5 shows, in graphical form, a timing diagram showing the timing of 8-bit binary counter 310 of timing generator 200.

FIG. 5 shows, in graphical form, a timing diagram showing the timing of 8-bit binary counter 310 of timing generator 200.

Figure 6:
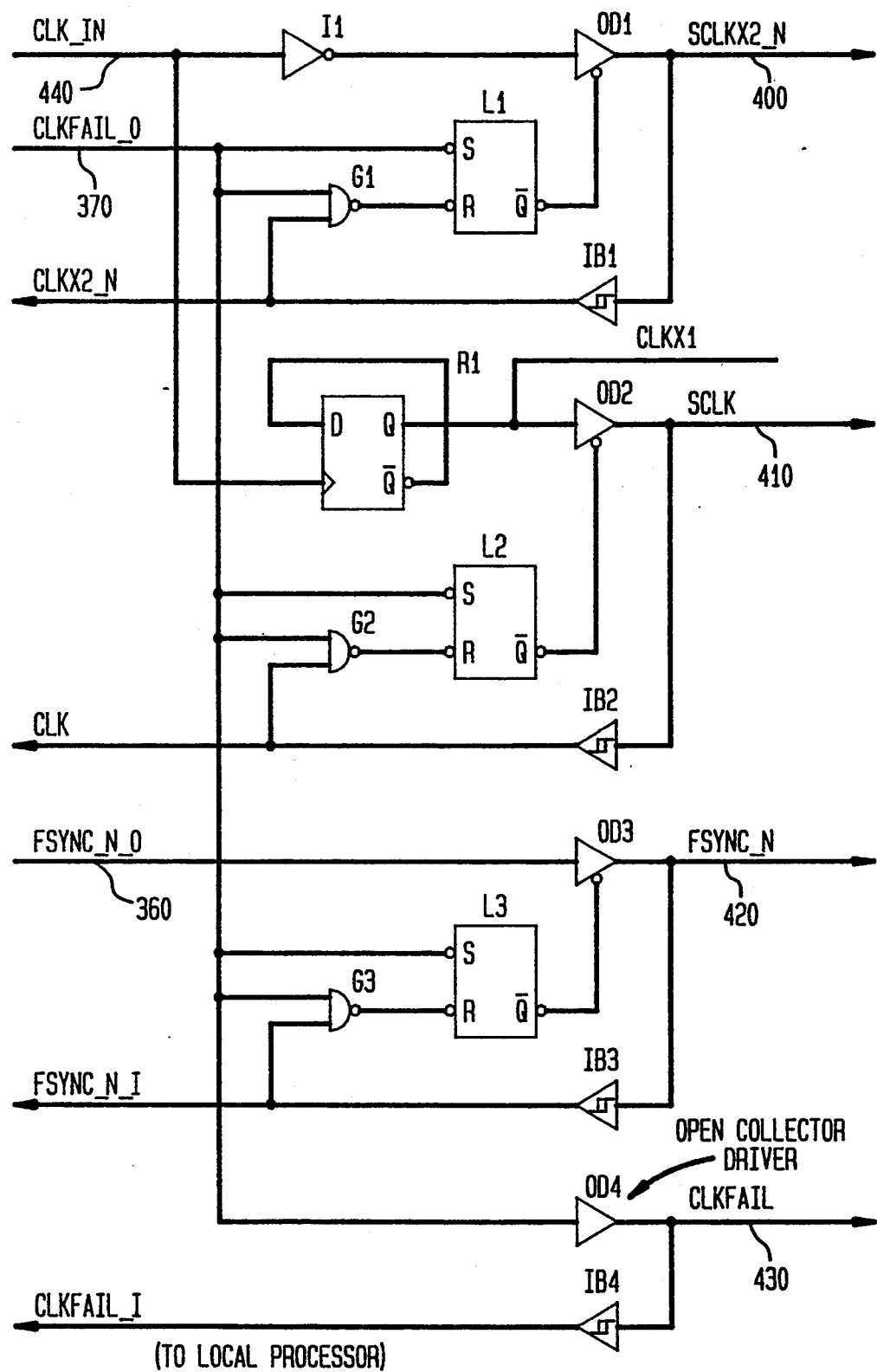
FIG. 6 shows a block diagram of a second portion of an embodiment of timing generator 200 shown in FIG. 3.

FIG. 6 shows a block diagram of a second portion of an embodiment of timing generator 200 shown in FIG. 3. As shown in FIG. 6, the output enable control mechanism for SCLKX2_N 400, SCLK 410, and FSYNC_N 420 is the same. In particular, whenever CLKFAIL_O 370 is low (bus master mode), latches L1, L2 and L3 are held set with their Q_N outputs low (logic 0). This enables output drivers OD1, OD2 and OD3. A low on CLKFAIL_O 370 also causes "open collector" driver OD4 to drive SCbus signal CLKFAIL low. Whenever CLKFAIL_O 370 transitions from low to high, latches L1, L2 and L3 are no longer held set and, as a result, gates G1, G2 and G3 are enabled while output drivers OD1, OD2, and OD3 are still enabled. Whenever the outputs of OD1, OD2, and OD3 drive high (logic 1), the SCbus signals are fedback through IB1, IB2 and IB3. This causes the outputs of gates G1, G2 and G3 to go low. This forces latches L1, L2 and L3 to be reset and, in turn, removes the enable from OD1, OD2 and OD3 to cause their outputs to go tri-state. A high on CLKFAIL_O 370 also causes "open collector" driver OD4 to go tri-state.

SCbus CLKFAIL signal 430 is fedback through IB4 as CLKFAIL_I to local processor 230. The source of SCLKX2_N 400 is CLK_IN 440 inverted by I1. The source of SCLK 410 is CLK_IN 440 divided by 2. DFF R1 has its Q_N output connected back to its D input causing the Q output to toggle on every rising edge of CLK_IN 440. The source of FSYNC_N 420 is the FSYNC_N_O 360 signal generated by R7 shown in FIG. 4.

Figure 7:
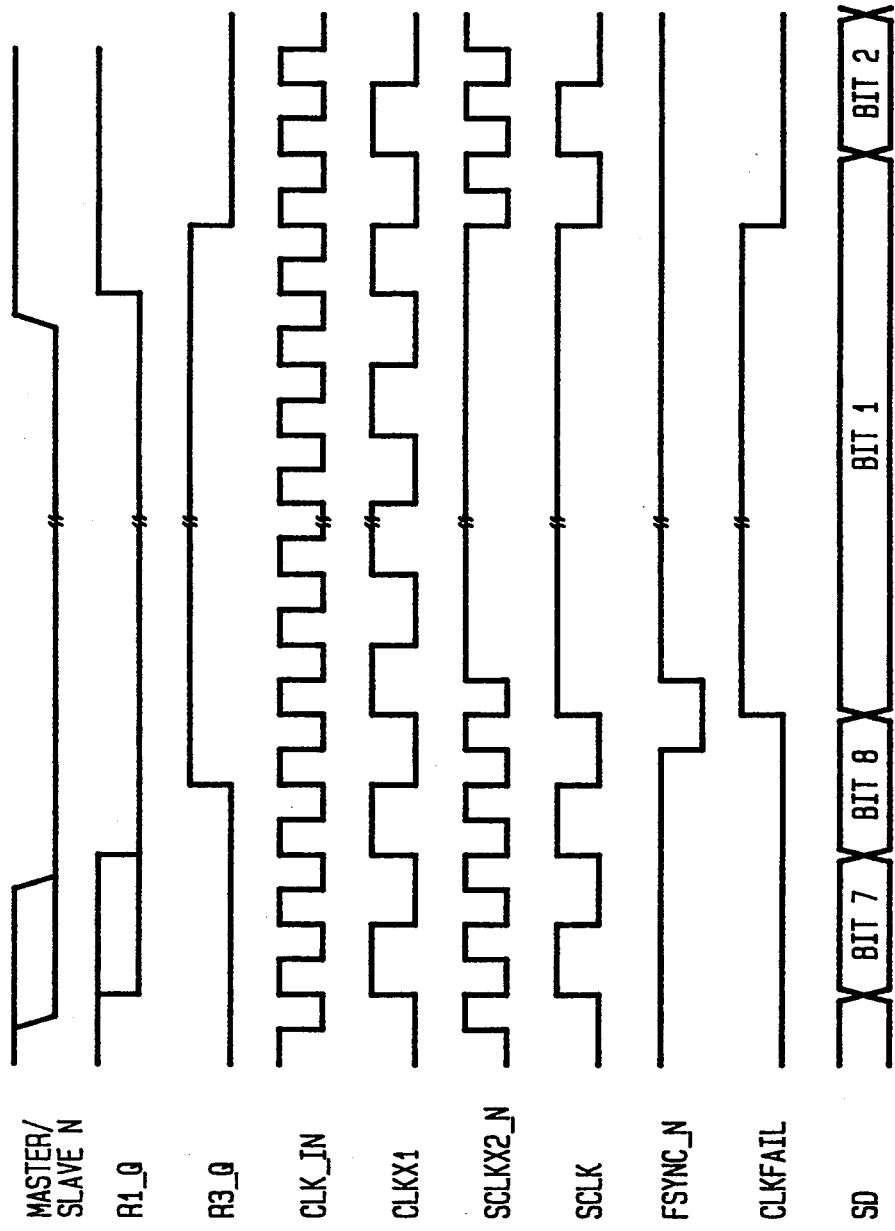
FIG. 7 shows, in graphical form, a timing diagram showing CLKFAIL.

FIG. 7 shows, in graphical form, a timing diagram showing CLKFAIL.

Figure 8:
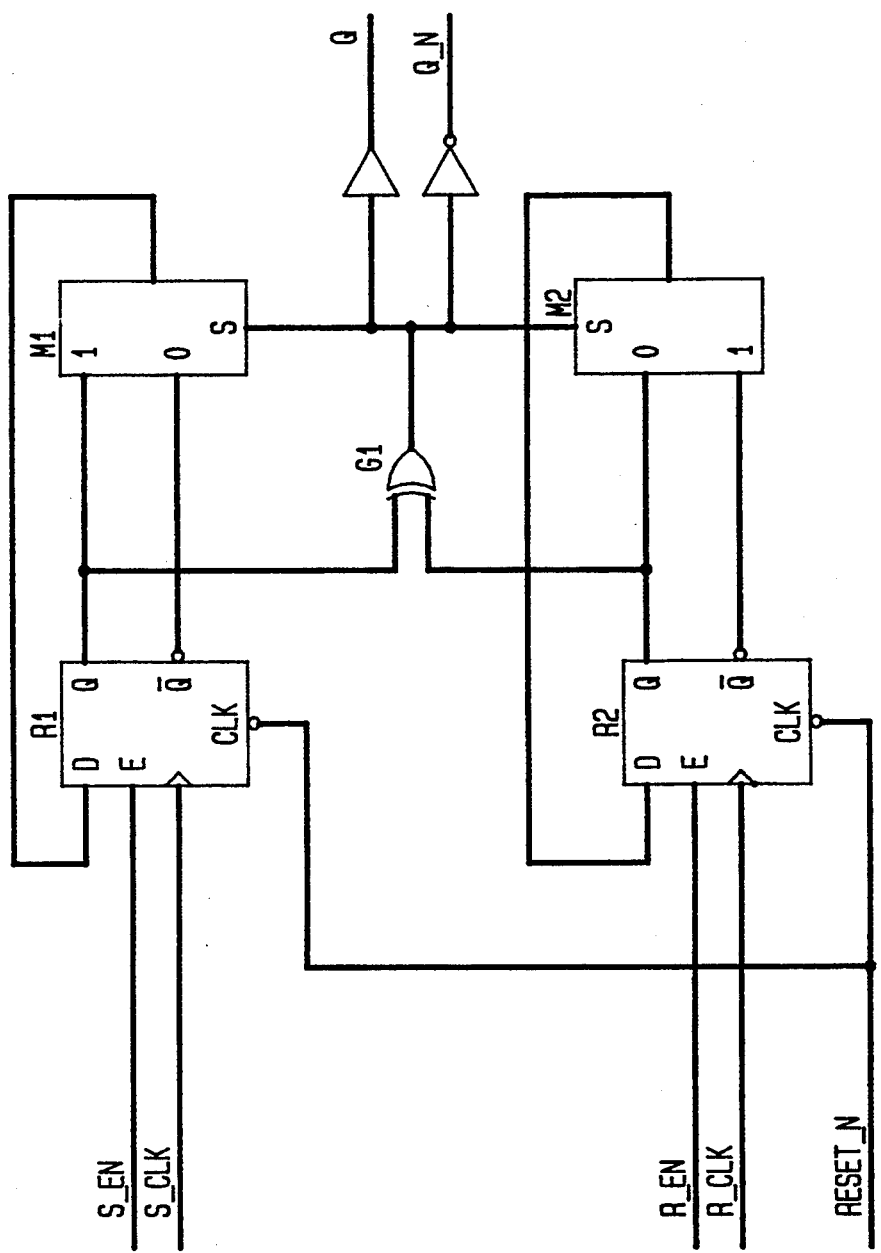
FIG. 8 shows a block diagram of an embodiment of SR Edge Triggered Latch 390 shown in FIG. 4.

FIG. 8 shows a block diagram of an embodiment of SR Edge Triggered Latch 390 shown in FIG. 4. As shown in FIG. 8, SR Edge Triggered Latch (SREL) 390 is an embodiment of logic that allows an output "Q" to set to logic 1 with the rising edge of one input and cleared to logic 0 with the rising edge of a second input. In addition, the circuit provides enable inputs to further qualify the clock inputs. Upon reset, DFF R1 and R2 are cleared. The output of exclusive or gate G1 is logic 0. Mux M1 routes Q_N of R1 back to the D input of R1 while mux M2 routes Q of R2 back to the D input of R2. This state allows R1 to toggle when clocked while R2 will hold its current value when clocked. Whenever R1's S_EN input is at logic 1 and a rising edge occurs on S_CLK, DFF R1 toggles to logic 1. The output of G1 is now logic 1. SREL 390 is now set. The output of M1 now routes the Q to the D of R1 while M2 routes Q_N to the D of R2. This state allows R2 to toggle when clocked while R1 will hold its current value when clocked. Whenever R2's R_EN input is at logic 1 and a rising edge occurs on R_CLK, DFF R21 toggles to logic 1. With both inputs at logic 1, the output of G1 is now logic 0. SREL 390 is now cleared.

Figure 9:
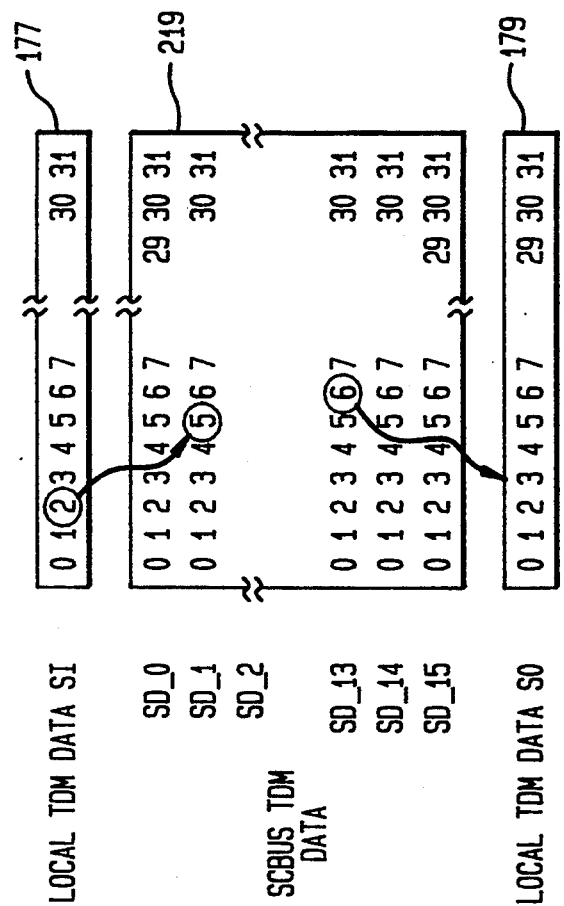
FIG. 9 shows a map of memory in digital switch 217 of FIG. 3.

FIG. 9 shows a map of memory 219 in digital switch 217 of FIG. 3. In a preferred embodiment of the present invention, memory 219 is large enough to store an entire frame of data so that digital switch 217 provides full frame buffering. Although this is not a requirement of the present invention, it enables one to provide non-blocked switching and enables one to group DS0 channels for transport. As was described above, the manner in which time slots are mapped is determined by input from local processor 230. For example, as shown in FIG. 9, time slot 2 in local TDM data 177 is placed into time slot 5 of SD-1 for the SCbus and time slot 6 of SD-13 for the SCbus is placed into time slot 3 of local TDM data 179.

In a preferred embodiment of the present invention, the data stored in memory 219 is registered on a bit basis. This provides an improvement over prior switching apparatus which register data on a byte basis since the embodiment of the present invention can switch the last input slot on a frame into the first slot of the next frame.

Figure 12:
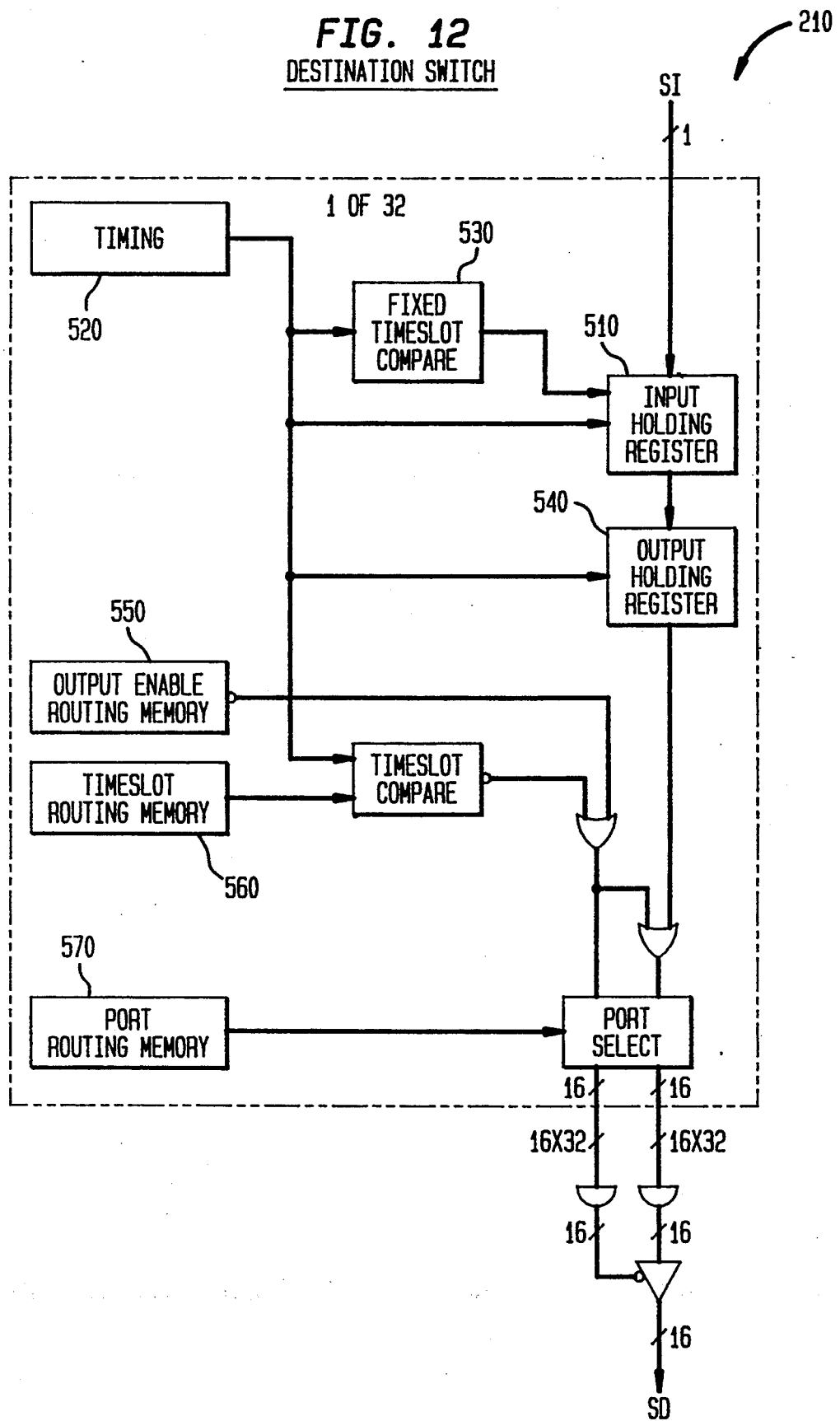
FIG. 12 shows a block diagram of destination switch 210 of FIG. 3.
Figure 13:
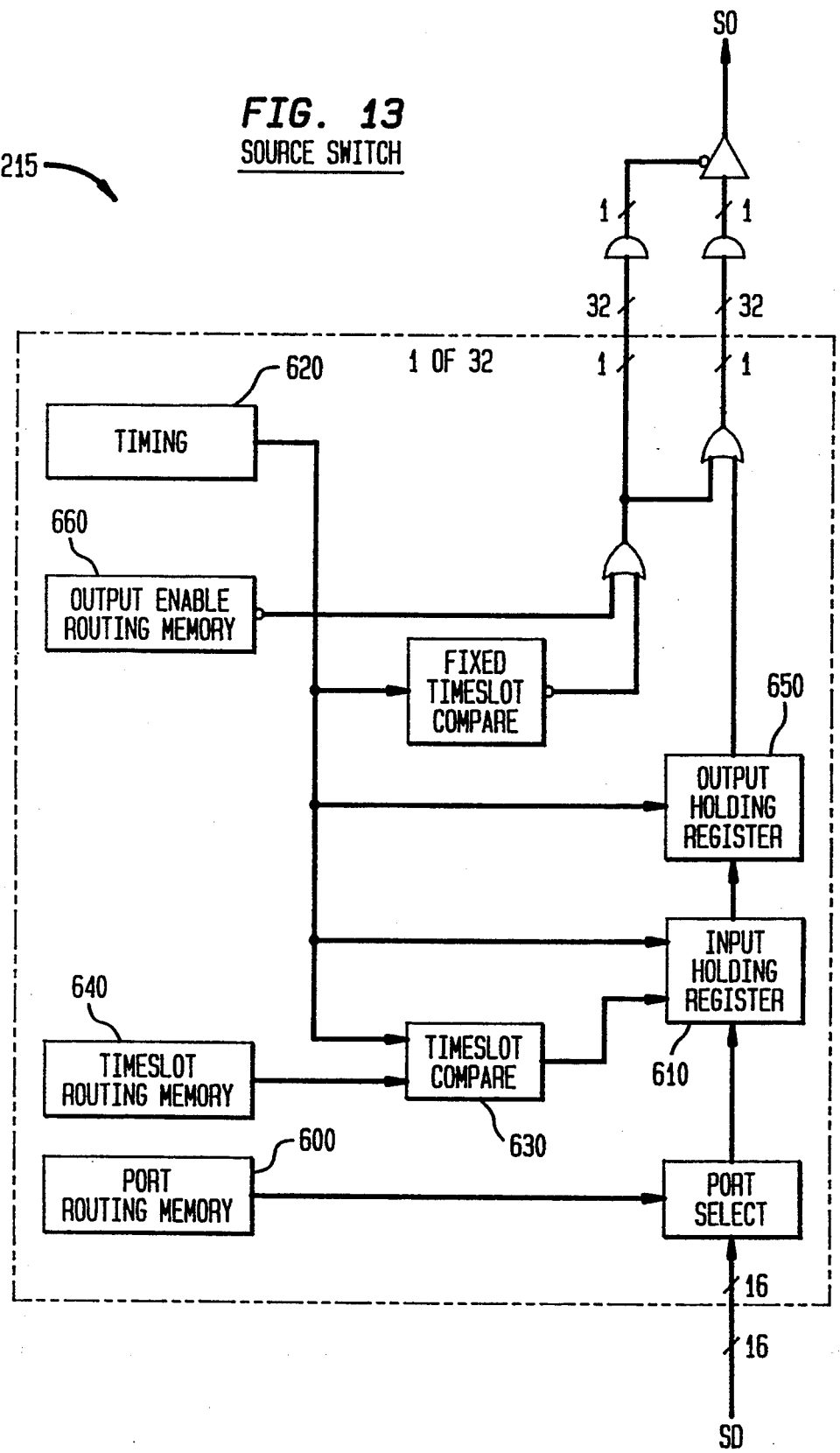
FIG. 13 shows a block diagram of source switch 215 of FIG. 3.

FIG. 12 shows a block diagram of destination switch 210 of FIG. 3 and FIG. 13 shows a block diagram of source switch 215 of FIG. 3.

Destination Switch 210 is comprised of 32 channel blocks and a common output section. One (1) of the 32 channel blocks is shown in FIG. 12 and will be described below. In particular, serial data from SI is loaded into input holding register 510. Data is loaded into input holding register 510 one bit at time, starting with bit 1 of a timeslot and ending with bit 8. Loading of input holding registers is controlled by timing section 520 and fixed timeslot comparator 530. Each of the 32 channels has a fixed timeslot comparator based on the channel number (for example: channel 0's comparator is testing for timeslot 0). If the current timeslot from timing section 520 matches the fixed timeslot compare, then input holding register 510 is loaded. Data from input holding register 510 is transferred to output holding register 540 at only one time during the frame. This occurs near the frame boundary. Only after bit 1 of timeslot 31 is loaded into input holding register 510 and also after bit 1 has been output through to the SD from output register 540 will the transfer of bit 1 take place (bit 1 of all 32 blocks is transferred at this time). The other bits have similar timing. This transfer mechanism insures that all timeslots switched from SI to SD have a 1 frame delay. This feature is particularly useful when bundling of timeslots is required. Regardless of the path for switching timeslots, all timeslots that started out in a frame together arrive at the other end of the switch in the same frame. From output holding register 540, serial data is enabled by first having the output enable routing memory 550 bit set and secondly by comparing the current timeslot to the timeslot loaded into timeslot routing memory 550. 2 signals per channel are created during this process, the serial data line and an output enable signal. Port routing memory 570 provides an input to port select logic 580 which determines the output port to which the serial data and output enable will be transferred. The outputs from all 32 channels come together to form a bus of 1024 signals. Serial data goes to sixteen 32-input and-gates (1 for each serial port). The output enable goes to similar sixteen 32-input and-gates. The output from the output enable and-gate is used as the tri-state control of the SD line drivers and the input of the line drivers is the output serial data and-gates.

Source Switch 215 is comprised of 32 channel blocks and a common output section. One of the 32 channel blocks is shown in FIG. 13 and will be described below. In particular, 1-of-16 SD lines, enabled by port routing memory 600 is loaded into input holding register 610. Data is loaded into input holding register 610 1 bit at time, starting with bit 1 of a timeslot and ending with bit 8. Loading of input holding register 610 is controlled by timing section 620 and timeslot comparator 630. If the current timeslot from timing section 620 matches the timeslot from timeslot routing memory 640, then input holding register 610 is loaded. Data in input holding register 610 is transferred to output holding register 650 at only one time during the frame. (see above with respect to the description of Destination Switch 210). From output holding register 650, serial data is enabled by first having output enable bit routing memory 660 set and secondly by comparing the current timeslot to the fixed timeslot. Two signals per channel are created during this process, the serial data line and an output enable signal. The outputs from all 32 channels come together to form a bus of 64 signals. The serial data goes to a 32-input and-gate and the output enable goes to a similar 32-input and-gate. The output from the output enable and-gate is used as the tri-state control of the SO line driver and the input of the line driver is the output serial data and-gate.

As has been described above, the SCbus is a serial bus that transports data via 16 synchronous data lines and it transports message-based signaling information over a dedicated common signaling channel. The SCbus operates at a maximum rate of 8.192 Mbps for a total synchronous data throughput of 131.072 Mbps. The common signaling channel runs at 2.048 Mbps regardless of the data bus speed.

At the 4.096 Mbps default (65.536 Mbps throughput), as described above, the SCbus can be implemented as an interboard bus using a 26-pin multidrop ribbon cable. This rate represents the optimum bus speed for ISA and MCA-based expansion boards used widely in call processing systems. The SCbus also runs at 2.048 Mbps (32.768 Mbps throughput, 512 time slots) for MITEL ST-bus and Siemens PCM Highway compatibility.

The SCbus default rate supports 1024 unidirectional time slots in a single machine. This is twice the number supported by second generation buses, depending on the application. For voice applications, this means that 512 full duplex channels using out-of-band signaling are supported.

By utilizing non-blocking switching, the SCbus can provide non-blocked switching between all time slots. Any time slot on any resource can access any other time slot on the bus. Additionally, one time slot can broadcast to any number of other time slots. Further, the SCbus allows high speed, clear channel data transport as a result of its ability to dynamically bundle time slots together. Because the SCbus provides for full frame buffering and time slot synchronization, an application can bundle multiple time slots together and treat them as a single, continuous, high bandwidth channel.

As has been described above, the SCbus features automatic clock fall back. If a component providing the master clock for a system fails, the system can reassign the master clock function to another component before loss of synchronization with the network occurs. Systems based on previous architectures have relied on watchdog timers implemented at the application level to prevent loss of synchronization. However, the response time of a software watchdog is not always adequate to prevent loss of signal.

Those skilled in the art recognize that further embodiments of the present invention may be made without departing from its teachings.

What is claimed is:

1. A bus system which comprises:
   a synchronous, time-division-multiplexed (TDM), data bus which is comprised of a plurality of synchronous, bidirectional, serial data lines;
   a serial message bus for transmitting messages between modules connected to the bus system; and
   two clock lines for carrying two clock signals, a framing pulse line for carrying a framing pulse signal, and a clock-fail control line for carrying a clock-fail control signal for asserting and releasing clock master status.

2. The bus system of claim 1 wherein the serial message bus is a multi-master, contention bus.

3. The bus system of claim 2 wherein the message bus operates in accordance with an HDLC protocol.

4. The bus system of claim 1 which further comprises:
   a clock master interface for driving the two clock signals on the two clock lines, the framing pulse signal on the framing; pulse line, and the clock-fail control signal on the clock-fail control line;
   and one or more clock slave interfaces for receiving the two clock signals on the two clock lines, the framing pulse signal on the framing pulse line, and the clock-fail control signal on the clock-fail control line.

5. The bus system of claim 4 wherein the clock master interface comprises means for asserting the clock master status by driving the clock-fail control signal to a predetermined logical level.

6. The buts system of claim 5 wherein the clock master interface comprises means for releasing the clock master status by releasing the clock-fail control signal from the predetermined logical level.

7. The bus system of claim 6 wherein the clock master interface and at least one of the one or more clock slave interfaces comprise means for shifting data onto the data bus on a rising edge of one of the two clock signals.

8. The bus system of claim 7 wherein the clock master interface and at least one of the one or more clock slave interfaces comprises means for shifting data off the data bus on or after the falling edge of the one of the two clock signals.

9. The bus system of claim 8 wherein each serial data stream on the data bus is divided into frames and each frame is further divided into 8-bit subframes called time slots and the clock master interface and at least one of the one or more clock slave interfaces comprises means for resetting a time slot counter for data on the data bus during the framing pulse signal.

10. The bus system of claim 9 wherein the clock master interface and at least one of the one or more clock slave interfaces comprises means for incrementing or resetting the time slot counter for data on the data bus on the rising edge of the one of the two clock signals.

11. The, bus system of claim 6 wherein at least one of the one or more clock slave interfaces further comprises means for monitoring the clock-fail control signal and for achieving clock master status by driving the clock-fail control signal to the predetermined logical level whenever the clock-fail control signal is released from the predetermined level.

12. The bus system of claim 4 wherein at least one of the clock master interface and the one or more clock slave interfaces comprise switching means for switching data among time slots on the data bus.

13. The bus system of claim 12 wherein the switching means comprises means for accessing data for switching at the bit level.

14. The bus system of claim 13 wherein the switching means comprises means for switching between all time slots on the data bus.

15. The bus system of claim 12 wherein the switching means comprises means for broadcasting one time slot to any number of other time slots.

16. The bus system of claim 12 wherein the switching means comprises means for bundling time slots together.

17. The bus system of claim 4 wherein one of the two clock signals has a frequency and the other one of the two clock signals has a frequency which is substantially twice the frequency; the other one of the two clock signals is inverted in phase with respect to the one of the two clock signals; and transitions of the one of the two clock signals occur substantially on a falling edge of the other one of the two clock signals.

18. The bus system of claim 12 wherein the switching means comprises means for non-blocking switching between all time slots on the data bus.

* * * * *